(12) United States Patent
Chervu

(10) Patent No.: US 10,737,631 B2
(45) Date of Patent: Aug. 11, 2020

(54) ROOF RACK STANCHION COVER

(71) Applicant: Nissan North America, Inc., Franklin, TN (US)

(72) Inventor: Raghu Chervu, Farmington Hills, MI (US)

(73) Assignee: Nissan North America, Inc., Franklin, TN (US)

( * ) Notice: Subject to any disclaimer, the term of this patent is extended or adjusted under 35 U.S.C. 154(b) by 64 days.

(21) Appl. No.: 16/119,171

(22) Filed: Aug. 31, 2018

(65) Prior Publication Data

US 2020/0070733 A1 Mar. 5, 2020

(51) Int. Cl.
*B60R 9/058* (2006.01)
*B60R 99/00* (2009.01)

(52) U.S. Cl.
CPC .............. *B60R 9/058* (2013.01); *B60R 99/00* (2013.01)

(58) Field of Classification Search
CPC ............ B60R 9/04; B60R 9/058; B60R 9/045
See application file for complete search history.

(56) References Cited

U.S. PATENT DOCUMENTS

| | | | |
|---|---|---|---|
| 4,279,368 A * | 7/1981 | Kowalski ................ | B60R 9/04 224/309 |
| 4,341,332 A * | 7/1982 | Kowalski ................ | B60R 9/04 224/309 |
| 4,487,348 A | 12/1984 | Mareydt | |
| 5,474,218 A | 12/1995 | Arsenault, Jr. et al. | |
| 5,893,499 A * | 4/1999 | Lumpe ..................... | B60R 9/04 224/309 |
| 6,102,265 A | 8/2000 | Stapleton | |
| 6,247,881 B1 * | 6/2001 | Shuen ................... | B60P 7/0815 410/101 |
| 7,866,516 B2 * | 1/2011 | Binder ..................... | B60R 9/04 224/309 |
| 9,409,527 B2 * | 8/2016 | Hubbard ................ | B60R 9/045 |
| 10,005,403 B2 * | 6/2018 | Calvin ..................... | B60J 7/106 |
| 2004/0262346 A1 * | 12/2004 | Thiele ..................... | B60R 9/05 224/326 |
| 2011/0174853 A1 | 7/2011 | Hubbard | |

* cited by examiner

*Primary Examiner* — Corey N Skurdal
(74) *Attorney, Agent, or Firm* — Young Basile Hanlon & MacFarlane, P.C.

(57) ABSTRACT

A carrier assembly for attachment to a side rail of a vehicle includes a cross bar configured to extend from a portion of the side rail and a coupling assembly disposed at least partially in a stanchion that extends from an end of the cross bar proximate the side rail. The coupling assembly is configured to couple a portion of the cross bar to the side rail. The carrier assembly also includes a cover configured to engage at least a portion of the stanchion to enclose the coupling assembly and a fastener configured to extend through an aperture disposed on a side of the stanchion opposite the cover and to engage a boss extending from a side of the cover facing the stanchion.

18 Claims, 4 Drawing Sheets

ROOF RACK STANCHION COVER

TECHNICAL FIELD

This disclosure relates to roof rack stanchions, and in particular, to a cover for a roof rack stanchion.

BACKGROUND

A vehicle, such as a passenger vehicle or a commercial vehicle, may utilize various roof racks or carrier assemblies in order to carry loads, such as luggage, packages, hobby equipment, or other suitable loads, on top of the vehicle. For example, the vehicle may include one or more cross bars attached to corresponding side rails on the roof of the vehicle. A load may be placed onto the one or more cross bars and secured thereto (e.g., using cables, rope, latches, clamps, or other suitable securing mechanisms).

The various carrier assemblies may be attachable to and/or detachable from the vehicle. For example, a carrier assembly may include one or more stanchions disposed on an associated cross bar. The stanchions may include a suitable coupling assembly that allows the stanchion, and, accordingly, the cross bar, to be attached to a corresponding side rail while the carrier assembly is in use and detached from the side rail when an operator of the vehicle desires to remove the carrier assembly from the vehicle.

SUMMARY

Disclosed herein are aspects, features, elements, implementations, and embodiments of roof rack stanchion covers.

An aspect of the disclosed embodiments is a carrier assembly for attachment to a side rail of a vehicle includes a cross bar configured to extend from a portion of the side rail and a coupling assembly disposed at least partially in a stanchion that extends from an end of the cross bar proximate the side rail. The coupling assembly is configured to couple a portion of the cross bar to the side rail. The carrier assembly also includes a cover configured to engage at least a portion of the stanchion to enclose the coupling assembly and a fastener configured to extend through an aperture disposed on a side of the stanchion opposite the cover and to engage a boss extending from a side of the cover facing the stanchion.

Another aspect of the disclosed embodiments is a system includes a cross bar configured to extend from a portion of a side rail of a vehicle and a coupling assembly disposed at least partially in a stanchion that extends from an end of the cross bar proximate the side rail. The coupling assembly is configured to couple a portion of the cross bar to the side rail. The system also includes a cover having a profile corresponding to a profile of the stanchion. The cover is configured to engage at least a portion of the stanchion to enclose the coupling assembly. The system also includes a fastener configured to extend through an aperture centrally disposed on a first side of the stanchion and to engage a boss extending from a first side of the cover.

Another aspect of the disclosed embodiments is a carrier assembly for a vehicle includes a cross bar configured to extend from a portion of a side rail of the vehicle and a coupling assembly disposed at least partially in a stanchion that extends from an end of the cross bar proximate the side rail. The coupling assembly is configured to attach a portion of the cross bar to the side rail. The carrier assembly also includes a cover having an arcuate shaped profile that corresponds to a profile of the stanchion. The cover is configured to engage at least a portion of the stanchion to enclose the coupling assembly. The carrier assembly also includes a fastener configured to extend through an aperture centrally disposed on a first side of the stanchion that faces the vehicle and to engage a boss extending from a side of the cover that faces a second stanchion opposite the first side of the stanchion.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

Variations in these and other aspects, features, elements, implementations, and embodiments of the methods, apparatus, procedures, and algorithms disclosed herein are described in further detail hereafter.

DETAILED DESCRIPTION

As described, a vehicle, such as a passenger vehicle or a commercial vehicle, may utilize various carrier assemblies in order to carry loads, such as luggage, packages, hobby equipment, or other suitable loads, on top of the vehicle. For example, as described, the vehicle may include one or more cross bars attached to corresponding side rails on the roof of the vehicle. A load may be placed onto the one or more cross bars and secured thereto (e.g., using cables, rope, latches, clamps, or other suitable securing mechanisms).

The various carrier assemblies may be attachable to or detachable from the vehicle. For example, a carrier assembly may include one or more stanchions disposed on an associated cross bar. The stanchions may include a suitable coupling assembly that allows the stanchion, and, accordingly, the cross bar, to be attached to a corresponding side rail while the carrier assembly is in use and detached from the side rail when an operator of the vehicle desires to remove the carrier assembly from the vehicle.

In some embodiments, the coupling assembly of a stanchion may be disposed, at least partially, within the stanchion. A cover, as will be described, may be configured to enclose the coupling assembly by mating with a portion of the stanchion. The cover may be selectively attachable and/or detachable from the stanchion. For example, as described, the carrier assembly may be attachable and/or detachable from the vehicle. The cover may be attached or mated with the stanchion such that the coupling assembly may be enclosed by the cover when the carrier assembly is attached to the vehicle and detached or unmated from the stanchion such that the coupling assembly is accessible in order to detach the carrier assembly from the vehicle.

In some embodiments, the cover may be attached to the stanchion using a fastener. The fastener may be disposed on an outboard side of the stanchion (e.g., facing away from the vehicle). However, outboard side disposed fasteners may be susceptible to corrosion due to exposure to wind, rain, snow, ice, light, and other external elements and/or forces. Additionally, outboard side disposed fasteners may be aesthetically undesirable and may require the use of additional damping features, such as felt or tape, between the stanchion and the cover to reduce or eliminate noise and/or rattle of the stanchion and cover. Accordingly, a cover that attaches to the stanchion using a fastener disposed on an inboard side of the stanchion (e.g., facing the vehicle) may be desirable.

Figure 1:
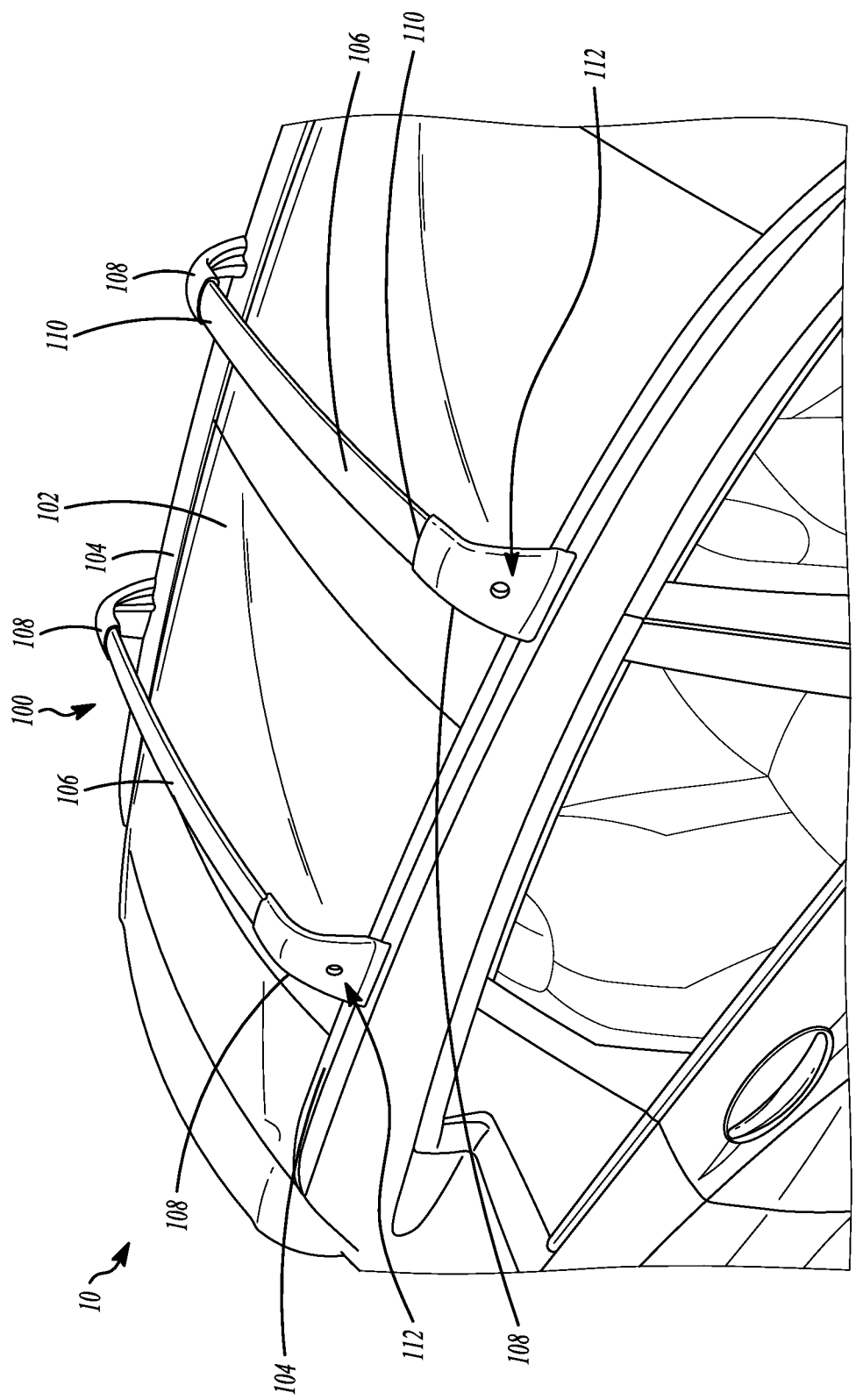
FIG. 1 generally illustrates a perspective view of a vehicle having a carrier assembly according to the principles of the present disclosure.
Figure 2:
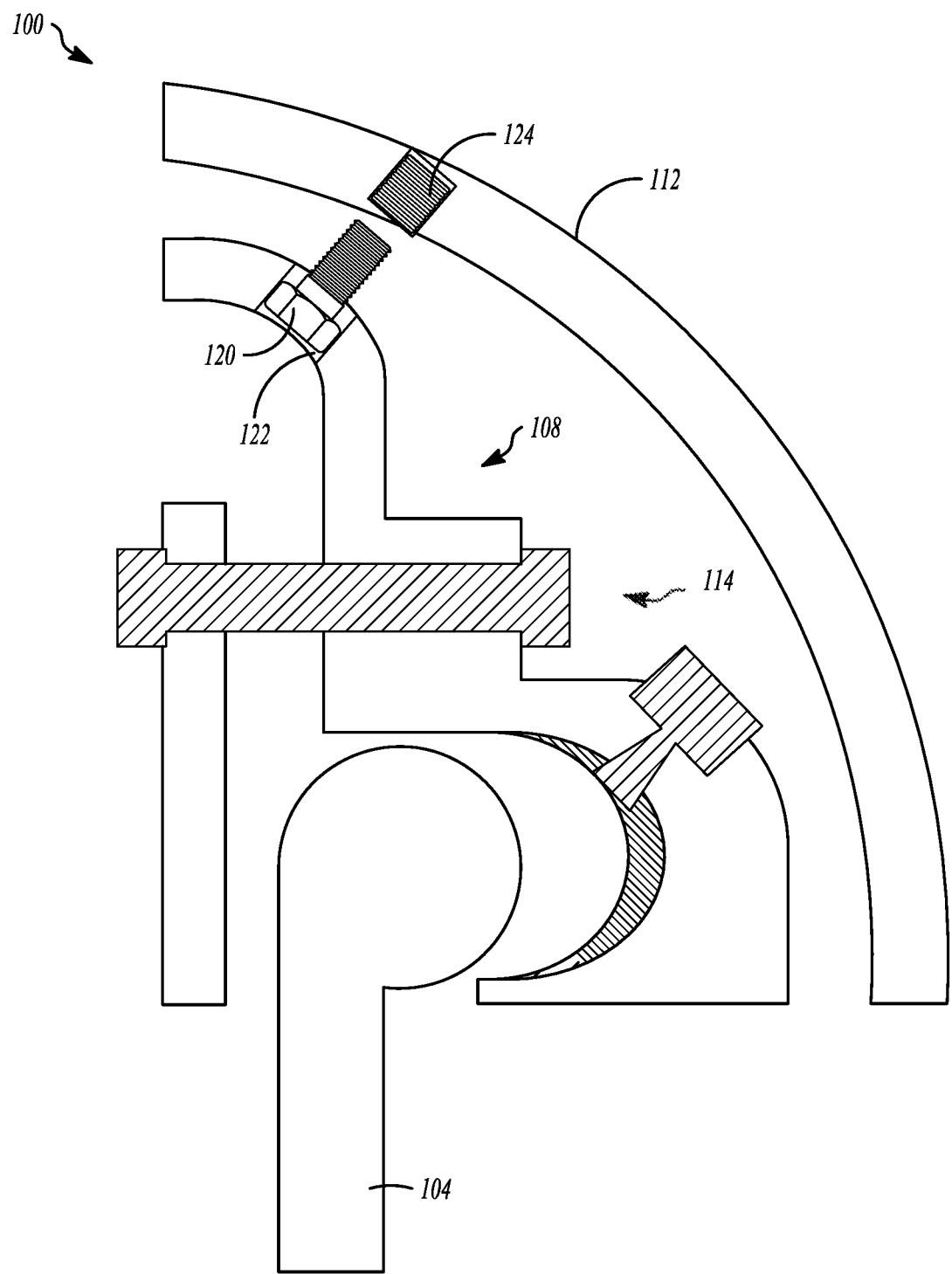
FIG. 2 generally illustrates a cross-sectional view of a portion of the carrier assembly of FIG. 1.
Figure 3:
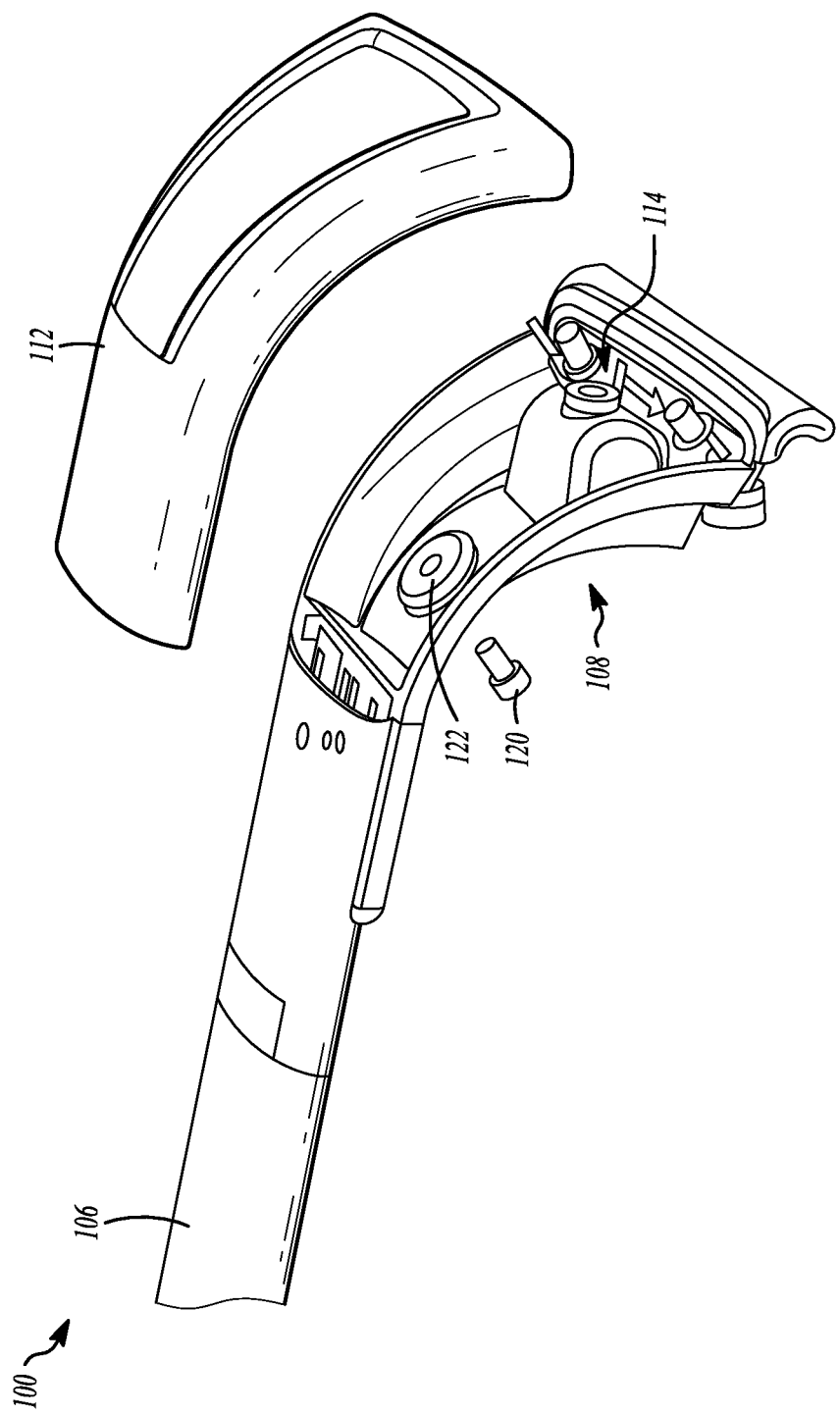
FIG. 3 generally illustrates a perspective view of a portion of the carrier assembly of FIG. 1.

FIGS. 1-2 generally illustrate a carrier assembly 100 according to the principles of the present disclosure. As described, the carrier assembly 100 may be attachable to and/or detachable from a vehicle 10. The vehicle 10 may include a passenger vehicle, commercial vehicle, or other suitable vehicle. For example, the vehicle 10 may include a car, truck, sport utility vehicle, van, mini-van, or other suitable vehicle. The vehicle 10 includes a roof 102 that extends along a top portion of the vehicle 10.

In some embodiments, the vehicle 10 may include side rails 104. The vehicle 10 may include two side rails 104, or any suitable number of side rails 104. The side rails 104 extend substantially parallel to one another along the top portion of the vehicle 10, proximate a perimeter portion of the roof 102.

The carrier assembly 100 includes one or more cross bars 106. The cross bars 106 may comprise any suitable material, such as, metals, polymers, other suitable materials, or a combination thereof. The cross bars 106 may comprise any suitable length, width, and height and may comprise any suitable rigidity or flexibility. When the carrier assembly 100 is attached to the vehicle 10, the cross bars 106 extend between corresponding side rails 104. The cross bars 106 extend substantially perpendicular to the respective side rails 104 or may extend between the respective side rails 104 at any suitable angle relative to the respective side rails 104. In some embodiments, the carrier assembly 100 includes two cross bars 106, or any suitable number of cross bars 106, such that a weight of a load, as described, may be substantially evenly distributed across the carrier assembly 100 or such that the weight of the load is desirably distributed across the carrier assembly 100.

The carrier assembly 100 includes stanchions 108. The stanchions 108 extend between a respective side rail 104 and a respective end of a corresponding cross bar 106 proximate a respective side rail 104. For example, a first cross bar 106 includes a first end 110 and a second end 110 opposite the first end 110. A first stanchion 108 extends from the first end 110 of the first cross bar 106 to a first side rail 104 and a second stanchion 108 extends from the second end 110 of the cross bar 106 to a second side rail 104. In some embodiments, each respective stanchion 108 may be fixed to each respective end of a corresponding cross bar 106 or may be selectively attachable to or detachable from each respective end of the corresponding cross bar 106. The stanchions 108 may comprise any suitable material, such as, metals, polymers, other suitable materials, or a combination thereof.

Each stanchion 108 includes a coupling assembly 114 configure to attach or couple a respective stanchion 108 to a respective side rail 104. In some embodiments, each coupling assembly 114 includes a clamp or other suitable mechanism configured to attach a coupling assembly 114 of a respective stanchion 108 to a respective side rail 104 and configured to detach the coupling assembly 114 of the respective stanchion 108 from the respective side rail 104. In some embodiments, the coupling assembly 114 may include a spring loaded mechanism or other suitable mechanism configured to allow a portion of the coupling assembly 114 to expand and/or contract, such that, the coupling assembly 114 attaches to and detaches from the respective side rail 104. It should be understood that the coupling assemblies 114 may comprise any suitable assembly and/or mechanism configured to attach respective stanchions 108 to respective side rails 104 and to detach respective stanchions 108 from respective side rails 104.

In some embodiments, each stanchion 108 includes a cover 112. Each cover 112 is configured to engage at least a portion of a respective stanchion 108 to enclose the coupling assembly 114 associated with the respective stanchion 108. For example a cover 112 is configured to mate with a portion of a respective stanchion 108 such that the cover 112 encloses the coupling assembly 114. The covers 112 may comprise any suitable material, such as, metals, polymers, other suitable materials, or a combination thereof.

Figure 4A:
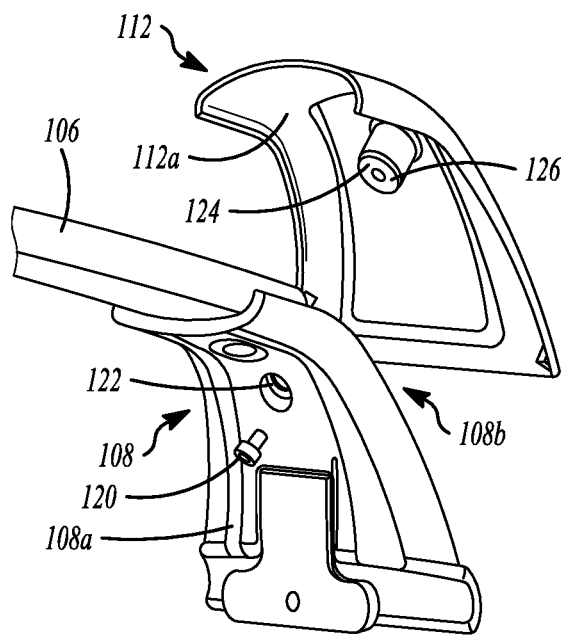
FIGS. 4A and 4B generally illustrate alternative perspective views of the portion of the carrier assembly of FIG. 3.
Figure 4B:
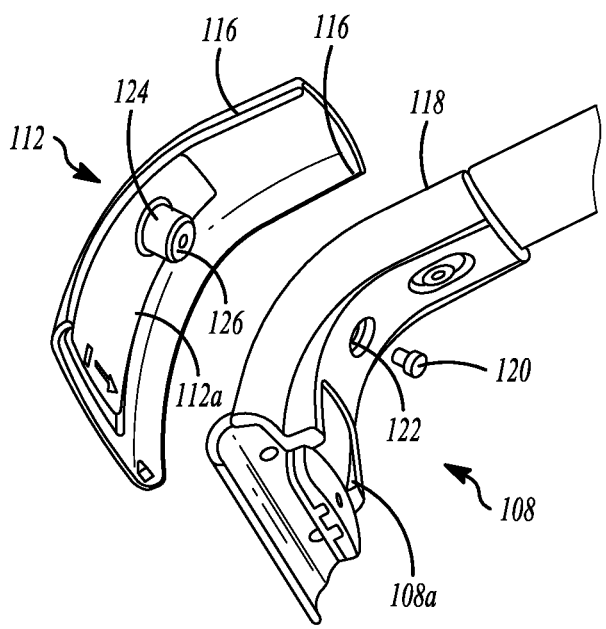

In some embodiments, each cover 112 includes a profile corresponding to a profile of each respective stanchion 108. For example, each cover 112 may include a substantially arcuate shaped profile, a substantially curved profile, a substantially straight profile, or any other suitable profile. The profile of each stanchion 108 corresponds to the profile of each respective cover 112 and may include a substantially arcuate shaped profile, a substantially curved profile, a substantially straight profile, or any other suitable profile. In some embodiments, the covers 112 include one or more protrusions configured to engage corresponding detents or receiving portions of respective stanchions 108. For example, as is generally illustrated in FIGS. 4A and 4B, the covers 112 may include one or more walls 116 that extend along a perimeter portion of the covers 112 toward respective stanchions 108. The walls 116 may be configured to engage and/or mate with receiving portions 118 that extend along a perimeter portion of respective stanchions 108.

The covers 112 are configured to be selectively attachable to or detachable from respective stanchions 108. For example, the carrier assembly includes fasteners 120 that are configured to attach respective covers 112 to respective stanchions 108. The fasteners 120 may include screws, bolts, pins, or other suitable fasteners. In some embodiments, the fasteners 120 may include M6 stainless steel screws. In some embodiments, the fasteners 120 may include conventional fasteners that are configured to be attach the respective covers 112 to the respective stanchions 108 using conventional tools. In some embodiments, the fasteners 120 are configured to attach the respective covers 112 to the respective stanchions 108 using specialized or dedicated tools keyed or configured to engage the fasteners 120.

In some embodiments, the stanchions 108 include an aperture 122. In some embodiments, the apertures 122 are disposed on a side 108a of the stanchions 108 that face the vehicle 10. This may be referred to as the inboard side 108a of the stanchions 108. The apertures 122 are disposed on the inboard side 108a of the stanchions 108 at a predefined angle. For example, the apertures 122 may be disposed on the inboard side 108a of the stanchions 108 at an acute angle relative to a respective cross bar 106, such as, an angle between 30° and 65° relative to the respective cross bar 106. In some embodiments, the apertures 122 may be disposed on the inboard side 108a of the stanchions 108 at a 90° angle relative to the respective cross bar 106, or other suitable angle.

In some embodiments, the apertures 122 may be disposed on the inboard sides 108a of the stanchions 108, such that, a user can use a tool to engage the fasteners 120 in order to attach and/or detach the covers 112 to and/or from the stanchions 108. For example, the apertures 122 may be disposed on the inboard sides 108a of the stanchions 108, such that, a space between the roof 102 of the vehicle 10 is large enough to allow a tool to engage the fasteners 120 without interference from the roof 102, the vehicle 10, the cross bars 106, the stanchions 108, or any other components of the carrier assembly 100 or the vehicle 10. Additionally, or alternatively, the apertures 122 may be disposed on the inboard sides 108a of the stanchions 108, such that, when the covers 112 engage and/or mate with respective stanchions 108, the position of the apertures 122 provide desirable balance and fit of the covers 112 with the stanchions 108. In some embodiments, the apertures 122 are disposed proximate a center of the inboard sides 108a of the stanchions 108.

The apertures 122 are configured to receive at least a portion of respective fasteners 120. The fasteners 120 are configured to extend through respective apertures 122. In some embodiments, the apertures 122 are configured, such that, the respective fasteners 120 counter sink into the apertures 122 when the respective fasteners 120 extend through the apertures 122. The fasteners 120 are configured to engage respective bosses 124 disposed on a side of the covers 112 that face respective stanchions 108.

The bosses 124 extend from a side 112a of the covers 112 that faces a side 108b of the stanchions 108 that is opposite the side 108a of the stanchions. The bosses 124 may extend from the sides 112a of the covers 112 at an angle that corresponds to the angle of corresponding apertures 122. For example, the bosses 124 may be extend from the sides 112a of the covers 112 at an acute angle relative to a respective cross bar 106, such as, an angle between 30° and 65° relative to the respective cross bar 106, at a 90° angle relative to the respective cross bar 106, or other suitable angle.

In some embodiments, the bosses 124 include a receiving portion 126 configured to receive and/or retain at least a portion of fasteners 120. The receiving portions 126 may include nuts, threads, or other suitable receiving portions. In some embodiments, the receiving portions 126 include an M6 brass nut. In some embodiments, the receiving portions 126 may be molded-in to the covers 112 or ultrasonically welded to the covers 112.

As described, the covers 112 are configured to engage and/or mate with corresponding stanchions 108. When the covers 112 engage and/or mate with the corresponding stanchions 108, the respective fasteners 120 engage and/or extend through respective apertures 122, as described. The fasteners 120 engage and/or are received by respective bosses 124 (e.g., via the receiving portions 126). The fasteners 120 may be tightened (e.g., using a corresponding tool) to draw the covers 112 toward the corresponding stanchions 108. The fasteners 120 may be loosened and/or removed from the bosses 124 and apertures 122 in order to detach the covers 112 from the stanchions 108.

As described, the position of the apertures 122 on the inboard sides 108a of the stanchions 108 provide a desirable balance and fit between the covers 112 and the stanchions 108. The position of the apertures 122 on the inboard sides 108a of the stanchions 108, may reduce or eliminate the use of additional damping features, such as felt or tape, between the stanchions 108 and the covers 112, which are typically used to reduce or eliminate noise and/or rattle of the covers 112 against the stanchions 108. Further, the position of the apertures 122 on the inboard sides 108a of the stanchions 108 may be aesthetically desirable and my protect the fasteners 120 from corrosion and/or other wear and tear resulting from exposure to wind, rain, snow, ice, light, and other external elements and/or forces.

In some embodiments, a carrier assembly for attachment to a side rail of a vehicle includes a cross bar configured to extend from a portion of the side rail and a coupling assembly disposed at least partially in a stanchion that extends from an end of the cross bar proximate the side rail. The coupling assembly is configured to couple a portion of the cross bar to the side rail. The carrier assembly also includes a cover configured to engage at least a portion of the stanchion to enclose the coupling assembly and a fastener configured to extend through an aperture disposed on a side of the stanchion opposite the cover and to engage a boss extending from a side of the cover facing the stanchion.

In some embodiments, the cover includes a profile corresponding to a profile of the stanchion. In some embodiments, the profile of the cover includes an arcuate shaped profile. In some embodiments, the aperture is disposed proximate a center of the side of the stanchion opposite the cover. In some embodiments, the fastener extends through the aperture at an acute angle relative to the cross bar. In some embodiments, the boss includes a nut configured to receive a portion of the fastener. In some embodiments, the coupling assembly includes a clamp. In some embodiments, the cover comprises a polymer material.

In some embodiments, a system includes a cross bar configured to extend from a portion of a side rail of a vehicle and a coupling assembly disposed at least partially in a stanchion that extends from an end of the cross bar proximate the side rail. The coupling assembly is configured to couple a portion of the cross bar to the side rail. The system also includes a cover having a profile corresponding to a profile of the stanchion. The cover is configured to engage at least a portion of the stanchion to enclose the coupling assembly. The system also includes a fastener configured to extend through an aperture centrally disposed on a first side of the stanchion and to engage a boss extending from a first side of the cover.

In some embodiments, the profile of the cover includes an arcuate shaped profile. In some embodiments, the fastener extends through the aperture at an acute angle relative to the cross bar. In some embodiments, the first side of the stanchion faces the vehicle. In some embodiments, the first side of the cover faces a side of the stanchion opposite the first side of the stanchion. In some embodiments, the boss includes a nut configured to receive a portion of the fastener. In some embodiments, the coupling assembly includes a clamp. In some embodiments, the cover comprises a polymer material.

In some embodiments, a carrier assembly for a vehicle includes a cross bar configured to extend from a portion of a side rail of the vehicle and a coupling assembly disposed at least partially in a stanchion that extends from an end of the cross bar proximate the side rail. The coupling assembly is configured to attach a portion of the cross bar to the side rail. The carrier assembly also includes a cover having an arcuate shaped profile that corresponds to a profile of the stanchion. The cover is configured to engage at least a portion of the stanchion to enclose the coupling assembly. The carrier assembly also includes a fastener configured to extend through an aperture centrally disposed on a first side of the stanchion that faces the vehicle and to engage a boss extending from a side of the cover that faces a second stanchion opposite the first side of the stanchion.

In some embodiments, the boss includes a nut configured to receive a portion of the fastener. In some embodiments, the coupling assembly includes a clamp. In some embodiments, the cover comprises a polymer material.

As used herein, the terminology "or" is intended to mean an inclusive "or" rather than an exclusive "or". That is, unless specified otherwise, or clear from context, "X includes A or B" is intended to indicate any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form.

Further, for simplicity of explanation, although the figures and descriptions herein may include sequences or series of steps or stages, elements of the methods disclosed herein may occur in various orders or concurrently. Additionally, elements of the methods disclosed herein may occur with other elements not explicitly presented and described herein. Furthermore, not all elements of the methods described herein may be required to implement a method in accordance with this disclosure. Although aspects, features, and elements are described herein in particular combinations, each aspect, feature, or element may be used independently or in various combinations with or without other aspects, features, and elements.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A carrier assembly for attachment to a side rail of a vehicle, the side rail attached to the vehicle with an attachment, the carrier assembly comprising:
    a cross bar configured to extend from a portion of the side rail;
    a coupling assembly disposed at least partially in a stanchion that extends from an end of the cross bar proximate the side rail, the coupling assembly being configured to couple a portion of the cross bar to the side rail;
    a cover configured to engage at least a portion of the stanchion to enclose the coupling assembly; and
    a fastener configured to extend through an aperture disposed on a surface of the stanchion opposite the cover and facing the upper surface of the vehicle, the fastener engaging a boss extending from a side of the cover facing the stanchion, the fastener extending through the aperture at an oblique angle relative to the surface of the stanchion.

2. The carrier assembly of claim 1, wherein the cover includes a profile corresponding to a profile of the stanchion.

3. The carrier assembly of claim 2, wherein the profile of the cover includes an arcuate shaped profile.

4. The carrier assembly of claim 1, wherein the aperture is disposed proximate a center of the surface of the stanchion opposite the cover.

5. The carrier assembly of claim 1, wherein the boss includes a nut configured to receive a portion of the fastener.

6. The carrier assembly of claim 1, wherein the coupling assembly includes a clamp.

7. The carrier assembly of claim 1, wherein the cover comprises a polymer material.

8. A system, comprising:
    a stanchion configured to extend from a portion of a side rail of a vehicle;
    a coupling assembly disposed at least partially in the stanchion, the coupling assembly being configured to couple the stanchion to the side rail without contacting the vehicle;
    a cover having a profile corresponding to a profile of the stanchion, the cover being configured to engage at least a portion of the stanchion to enclose the coupling assembly; and
    a fastener configured to extend through an aperture centrally disposed on the stanchion and to engage the cover, the fastener extending through the aperture at an oblique angle relative to an upper surface of the vehicle.

9. The system of claim 8, wherein the profile of the cover includes an arcuate shaped profile.

10. The system of claim 8, wherein the first side of the stanchion faces the vehicle.

11. The system of claim 8, wherein the first side of the cover faces a side of the stanchion opposite the first side of the stanchion.

12. The system of claim 8, wherein the boss includes a nut configured to receive a portion of the fastener.

13. The system of claim 8, wherein the coupling assembly includes a clamp.

14. The system of claim 8, wherein the cover comprises a polymer material.

15. A carrier assembly for a vehicle, comprising:
    a stanchion configured to extend from a portion of a side rail of the vehicle, the side rail attached to the vehicle with an attachment;
    a coupling assembly disposed at least partially in the stanchion, the coupling assembly being configured to attach the stanchion to the side rail;
    a cover having an arcuate shaped profile that corresponds to a profile of the stanchion, the cover being configured to engage at least a portion of the stanchion to enclose the coupling assembly; and
    a fastener configured to extend through an aperture centrally disposed on a first surface of the stanchion that faces an upper surface of the vehicle and to engage a boss in the cover, the fastener extending through the stanchion at an oblique angle.

16. The carrier assembly of claim 15, wherein the boss includes a nut configured to receive a portion of the fastener.

17. The carrier assembly of claim 15, wherein the coupling assembly includes a clamp.

18. The carrier assembly of claim 15, wherein the cover comprises a polymer material.

* * * * *